(12) United States Patent  
Nakatani et al.

(10) Patent No.: US 6,883,310 B2  
(45) Date of Patent: Apr. 26, 2005

(54) INTERNAL COMBUSTION ENGINE EMISSION CONTROL APPARATUS AND METHOD

(75) Inventors: Koichiro Nakatani, Susono (JP); Toshiaki Tanaka, Numazu (JP); Shinya Hirota, Susono (JP); Takamitsu Asanuma, Susono (JP); Koichi Kimura, Susono (JP); Shunsuke Toshioka, Numazu (JP); Akira Mikami, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 32 days.

(21) Appl. No.: 10/405,647

(22) Filed: Apr. 3, 2003

(65) Prior Publication Data

US 2003/0192306 A1 Oct. 16, 2003

(30) Foreign Application Priority Data

Apr. 15, 2002 (JP) ........................................ 2002-112444

(51) Int. Cl.[7] ................................................ F01N 3/00
(52) U.S. Cl. .............................. 60/288; 60/274; 60/292
(58) Field of Search ......................... 60/274, 287, 288, 60/292, 299, 297, 311

(56) References Cited

U.S. PATENT DOCUMENTS

| | | | | |
|---|---|---|---|---|
| 5,051,244 A | * | 9/1991 | Dunne et al. ................ | 423/212 |
| 5,233,830 A | * | 8/1993 | Takeshima et al. ........... | 60/278 |
| 5,264,186 A | * | 11/1993 | Harada et al. ............... | 422/171 |
| 5,365,734 A | * | 11/1994 | Takeshima .................... | 60/288 |
| 5,388,405 A | * | 2/1995 | Fujishita et al. .............. | 60/297 |
| 6,209,317 B1 | * | 4/2001 | Hirota ......................... | 60/297 |
| 6,378,298 B2 | * | 4/2002 | Harima et al. ................. | 60/288 |
| 6,502,391 B1 | * | 1/2003 | Hirota et al. .................. | 60/288 |

FOREIGN PATENT DOCUMENTS

| | | |
|---|---|---|
| JP | A 4-134115 | 5/1992 |
| JP | A 4-134116 | 5/1992 |
| JP | B2 2888045 | 2/1994 |
| JP | B2 2727906 | 9/1994 |
| JP | A 2001-317335 | 11/2001 |

* cited by examiner

*Primary Examiner*—Thomas Denion  
*Assistant Examiner*—Diem Tran  
(74) *Attorney, Agent, or Firm*—Oliff & Berridge, PLC

(57) ABSTRACT

An internal combustion engine emission control apparatus includes split passages that divide exhaust gas discharged from an internal combustion engine into a plurality of streams. Emission control catalysts are provided that individually divide the exhaust gas in the split passages, and remove a component present in the exhaust gas at a high removal rate if a temperature of exhaust gas that inflows via the split passages satisfies a predetermined temperature condition. A controller changes proportions of the amounts of flow of the exhaust gas into the split passages so that the predetermined temperature condition is satisfied in at least one split passage of the split passages. Therefore, the emission control can be performed in a broad range of changing temperatures of the exhaust gas.

9 Claims, 12 Drawing Sheets

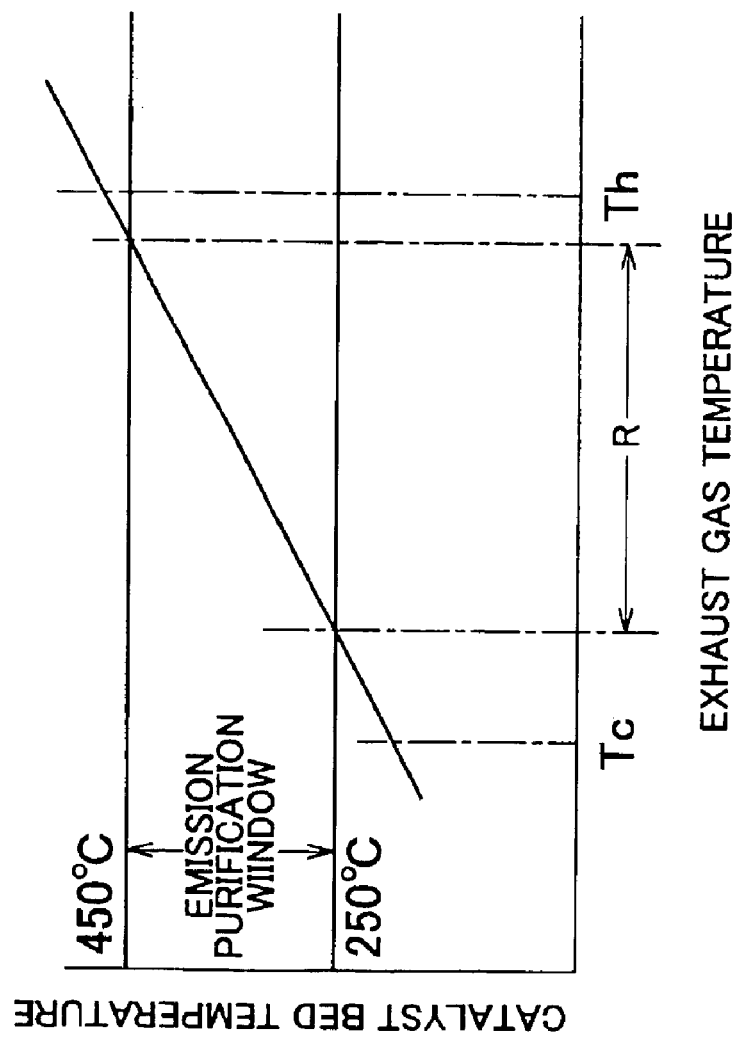

INTERNAL COMBUSTION ENGINE EMISSION CONTROL APPARATUS AND METHOD

INCORPORATION BY REFERENCE

The disclosure of Japanese Patent Application No. 2002-112444 filed on Apr. 15, 2002 including the specification, drawings and abstract is incorporated herein by reference in its entirety.

BACKGROUND OF THE INVENTION

1. Field of Invention

The invention relates to an emission control apparatus of an internal combustion engine and, more particularly, to an emission control apparatus that has a plurality of emission control catalysts in an exhaust system of an internal combustion engine, and an emission control method thereof.

2. Description of Related Art

An example of the emission control apparatus having a plurality of emission control catalysts in an exhaust system of an internal combustion engine is disclosed in, for example, Japanese Patent Gazette No. 2727906.

According to this example, split passageways are provided in the exhaust system of the internal combustion engine, and each split passageway is provided with a filter loaded with a NOx absorbent that is a catalytic substance serving as an emission control catalyst. Provided upstream of each filter are a shutter valve, a fuel injection nozzle, and a secondary air introducing device.

During operation of the internal combustion engine, the shutter valves provided in the split passageways are alternately opened and closed, so that two filters are alternately used, that is, a first one of the filters is put into a resting mode when a second filter is used to absorb or trap nitrogen oxides (NOx) and particulates (e.g., soot) from exhaust gas, and the second filter is put into the resting mode when the first filter is in use.

In each split passageway, the fuel injection nozzle and the secondary air introducing device are disposed immediately upstream of the filter and downstream of the shutter valve. During closure of the shutter valve (the rest period of the filter), the filter is regenerated by supplying fuel and air to the filter to ignite and burn particulates on the filter which may cause clogging of the filter. That is, the fuel injection nozzles and the secondary air introducing devices are devices for recovering the emission control capability of the filters.

Thus, by alternately using two filters so that a first filter is regenerated while the second filter is in use, and the second filter is regenerated while the first filter is in use, the related-art emission control apparatus achieves both prevention of engine output reduction caused by the simultaneous clogging of the two filters and continuous emission control during operation of the engine.

A recent focus of attention is a generally termed "continuous regeneration" particulate filter that oxides and burns trapped particulates continuously without producing luminous flames.

This particulate filter has an emission control effect of removing particulates, such as soot and the like, by the chemical action of the catalytic substance, as well as the capability for removing nitrogen oxides (NOx), and is therefore drawing attention as an emission control catalytic device for diesel engines and the like. More specifically, this filter device incorporates a filter loaded with an active oxygen releasing agent as a catalytic substance, and controls (removes) exhaust emissions by oxidizing and burning particulates trapped on the filter via active oxygen.

In this filter device, therefore, the clogging with particulate deposits does not occur, and the switching use of filters as in the aforementioned related-art emission control apparatus is not necessary. Thus, the filter device allows good emission control using a single particulate filter.

In the aforementioned various emission control catalytic devices, the management of a catalyst bed temperature is critical since emission control is performed by action of the catalytic substances. That is, the exhaust gas purification rate (emission purification rate) changes in accordance with the activity of the supported catalytic substance. Therefore, in order to achieve a high purification rate, the catalyst bed temperature needs to be kept within an appropriate temperature range (generally termed "emission purification window") as indicated in a purification rate diagram of FIG. 12.

With regard to an emission control catalytic device loaded with an active oxygen releasing agent or a NOx absorbent as mentioned above, the catalyst bed temperature range where high purification rate is achieved is relatively narrow. Therefore, for example, during long-hour idling operation or continuous high-load engine operation, etc., the bed temperature of the catalytic device excessively drops or rises, and often deviates from the aforementioned catalyst bed temperature range of high purification rate.

In a case where there is no effect of external thermal energy on the emission control catalyst, the catalyst bed temperature rises if high-temperature exhaust gas is supplied, and the catalyst bed temperature drops if low-temperature exhaust gas is supplied. That is, management of the catalyst bed temperature can be realized by adjustment of the temperature of exhaust gas, and high purification rate can be achieved by feeding exhaust gas at an appropriate temperature.

FIG. 13 is a diagram indicating a correlation between the temperature of an emission control catalyst and the exhaust gas temperature. As can be understood from this diagram, the catalyst bed temperature remains within the emission purification window while the temperature of exhaust gas flowing into the emission control catalyst is kept in an appropriate temperature range (see a range R in FIG. 13). That is, if exhaust gas having a temperature within the range R is supplied, the catalyst bed temperature enters the emission purification window, so that high purification rate can be achieved.

However, since the temperature of exhaust gas that flows into the emission control catalyst changes greatly depending on the state of engine operation, the exhaust gas temperature sometimes deviates from the temperature range of high purification rate. That is, as indicated in FIG. 13, the emission control catalyst experiences inflow of excessively low-temperature exhaust gas (e.g., a temperature Tc in FIG. 13), or inflow of excessively high-temperature exhaust gas (e.g., a temperature Th in FIG. 13) during real operation. Therefore, emission control is not always performed at high purification rate.

Since these drawbacks are attributed to characteristics of the emission control catalyst as mentioned above, the drawbacks can be resolved by changing the composition of the catalyst substance so as to enlarge the emission purification window. However, the changing of the catalyst composition is restricted by selection of an object to be removed.

Therefore, in reality, the changing of the catalyst composition cannot achieve considerable enlargement of the emission purification window.

SUMMARY OF THE INVENTION

In view of the above-described technical background, it is an object of the invention to provide an internal combustion engine emission control technology capable of controlling emission in an enlarged range of changing temperature of exhaust gas. It is another object of the invention to provide an internal combustion engine emission control technology that minimizes reduction of emission removal rate in a condition where the emission removal rate normally drops.

According to an exemplary embodiment of the invention, there is provided an engine emission control apparatus that includes: split passages that divide exhaust gas discharged from an engine into a plurality of streams; emission control catalysts that are provided individually in the split passages, and that remove a component present in the exhaust gas at a high removal rate if a temperature of exhaust gas that inflows via the split passages satisfies a predetermined temperature condition; and a controller that changes proportions of amounts of flow of the exhaust gas into the split passages so that the predetermined temperature condition is satisfied in at least one of the split passages.

In the emission control apparatus constructed as described above, split passages that divide the exhaust gas discharged from the engine into a plurality of streams are provided, and each split passage has an emission control catalyst. Each emission control catalyst removes a component of exhaust gas (emission control-object component) at a high removal rate at the time of inflow of the exhaust gas that satisfies the predetermined temperature condition. That is, the emission control catalysts have emission control characteristics of purifying the exhaust gas at a high purification rate upon inflow of the exhaust gas that satisfies the predetermined temperature condition.

This construction also includes the controller changing the proportions of the flow of the exhaust gas into the split passages, that is, the flow distribution. Furthermore, the controller changes the proportions of the amount of flow of the exhaust gas into the split passages so that a temperature condition of the exhaust gas that allows the high purification rate (predetermined temperature condition) is satisfied in at least one of the split passages.

Therefore, even if the engine discharges the exhaust gas having a temperature within a range where emission control at the high purification rate is normally impossible, the exhaust gas temperature in at least one of the split passages is controlled to an appropriate temperature by the flow control performed by the controller, so that the exhaust gas that flows via the split passage to the emission control catalyst is purified at the high purification rate by the emission control catalyst.

According to another exemplary embodiment of the invention, there is provided an emission control method of an engine having an emission control catalyst that removes a component present in the exhaust gas that flows into the emission control catalyst at a high removal rate if a temperature of the exhaust gas satisfies a predetermined temperature condition. The method includes the steps of: providing a plurality of emission control catalysts, and distributing the exhaust gas discharged from the engine to the emission control catalysts; and changing proportions of amounts of flow of the exhaust gas into the emission control catalysts so that the temperature of the exhaust gas that flows into at least one of the emission control catalysts satisfies the predetermined temperature condition.

In this emission control method, the exhaust gas discharged from the engine is distributed to a plurality of emission control catalysts. The exhaust gas is fed to the emission control catalysts at proportions of amounts of flow (that is, a flow distribution) which will allow a high emission removal rate on at least one of the emission control catalysts. Therefore, high emission removal rate can be achieved by an emission control apparatus as described above.

In the aforementioned various examples, the emission removal rate of the emission control apparatus can be improved by executing controls corresponding to the examples. The aforementioned various contents of the emission control apparatus and the emission control method may be suitably combined in any manner as long as such combinations are within the scope of the technical idea of the invention.

BRIEF DESCRIPTION OF THE DRAWINGS

The above and other objects, features, advantages, technical and industrial significances of this invention will be better understood by reading the following detailed description of preferred embodiments of the invention, when considered in connection with the accompanying drawings, in which:

FIG. 13 is a diagram indicating a correlation between the temperature of an emission control catalyst and the temperature of inflow exhaust gas.

DETAILED DESCRIPTION OF EXEMPLARY EMBODIMENTS

In the following description and the accompanying drawings, the present invention will be described in more detail in terms of exemplary embodiments.

An emission control apparatus in accordance with the invention will be described below, along with an emission control method in accordance with the invention. The below-described embodiment is merely one exemplary form of the invention, and detail structures of the emission control apparatus and the internal combustion engine to which the invention is applied may be modified according to various specifications and requirements.

Figure 1:
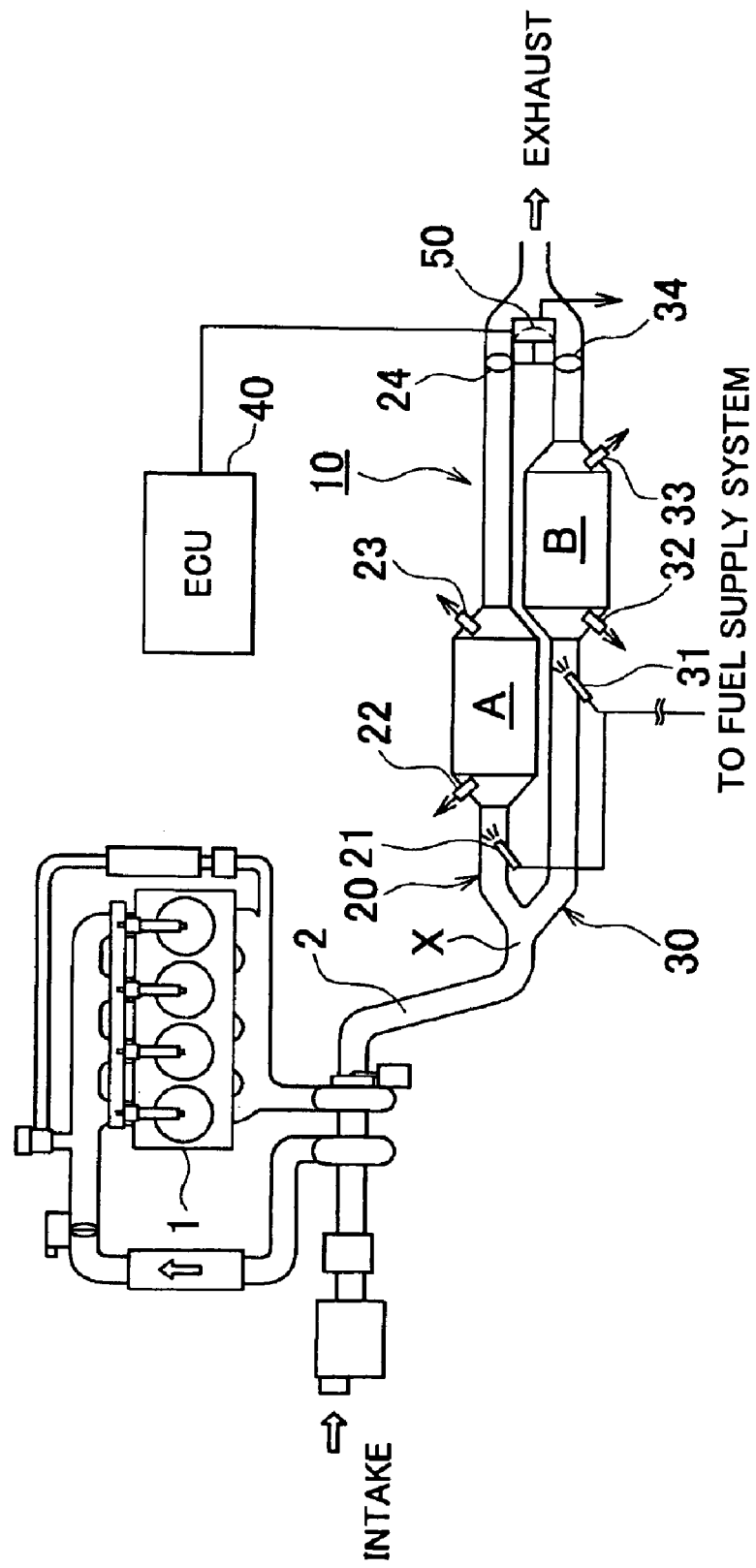
FIG. 1 is a schematic diagram illustrating the construction of an emission control apparatus in accordance with an exemplary embodiment of the invention.

As shown in FIG. 1, an internal combustion engine 1 capable of a lean-burn operation, represented by a vehicular diesel engine, has an exhaust passageway (exhaust pipe) 2 that branches into a split passageway 20 and a split passageway 30 that are disposed in parallel. The split passageway 20 is provided with a particulate filter A. The split passageway 30 is provided with a particulate filter B. An emission control apparatus 10 is thus formed.

The pipe lengths of the split passageways 20, 30 from a branch point X to the particulate filters A, B are different from each other. In FIG. 1, the particulate filter A of the split passageway 20 shown upward in FIG. 1 is disposed at a position relatively close to the branch point X whereas the particulate filter B of the split passageway 30 shown downward in FIG. 1 is disposed at a position that is farther from the branch point X than the position of the particulate filter A.

Therefore, due to the different pipe lengths to the particulate filters A, B, the heat release from exhaust gas also differs so that a difference occurs between the temperature of exhaust gas that flows into the particulate filter A via the split passageway 20 and the temperature of exhaust gas that flows into the particulate filter B via the split passageway 30.

As for the relationship with heat release, it can be said that the split passageway 20 in FIG. 1 is a split passageway with less heat release, and the split passageway 30 in FIG. 1 is a split passageway with greater heat release. In this embodiment, a heat release means in accordance with the invention is formed by the different pipe lengths from the branch point X to the particulate filters A, B.

Reductant adding nozzles 21, 31 are provided upstream of the particulate filters A, B. The reductant adding nozzles 21, 31 inject an appropriate amount of engine fuel as a reductant into the corresponding split passageways 20, 30 at appropriate timing so as to change the oxygen concentration in exhaust gas flowing into the particulate filters A, B over a plurality of times and therefore promote the emission control action of the particulate filters A, B. The emission control action associated with addition of a reductant will be described in detail later.

The valve opening actions of the reductant adding nozzles 21, 31 are controlled by an electronic control unit (ECU) 40 of the internal combustion engine 1. The valve opening action, the open valve duration related to the amount of addition, the valve opening timing related to the addition timing are determined with reference to outputs of various sensors read by the electronic control unit 40, the engine operation history (e.g., the amount of fuel consumed, the vehicle travel distance) recorded in the electronic control unit 40, etc.

In this embodiment, the sensors used for calculating the open valve duration and the valve opening timing include, for example, exhaust gas temperature sensors 23, 33 disposed downstream of the particulate filters A, B, air-fuel-ratio sensors 22, 32 disposed upstream of the particulate filters A, B, etc.

Exhaust choke valves 24, 34 as exhaust flow control means in accordance with the invention are provided farthest downstream in the split passageways 20, 30. In FIG. 1, the exhaust choke valve 24 is provided in the split passageway 20, and the exhaust choke valve 34 is provided in the split passageway 30. An actuator 50 as a device for operating the exhaust choke valves 24, 34 is provided near the merging point of the split passageways 20, 30.

The actuator 50 has a mechanism capable of holding the exhaust choke valves 24, 34 at arbitrary degrees of opening. Under the control of the electronic control unit 40, the actuator 50 holds the exhaust choke valves 24, 34 at requested degrees of opening. In conjunction with the control of opening of the valves, the exhaust choke valves 24, 34 are designed for inter-related operations. For example, under a certain condition, the exhaust choke valves 24, 34 operate so as to allow exhaust gas to flow at a ratio of 7:3. Under another condition, the valves operate so as to allow exhaust gas to flow at a ratio of 4:6. In this fashion, the proportions of exhaust gas that flows into the split passageways 20, 30 (flow distribution) are varied without reducing the amount of flow of exhaust gas discharged from the internal combustion engine 1.

The exhaust gas flow proportions are determined by the electronic control unit 40 on the basis of the state of operation. In accordance with the control valve (flow distribution) from the electronic control unit 40, the actuator 50 changes the proportions of exhaust gas that flows into the split passageways 20, 30. More specifically, the temperature of exhaust gas flowing into the branch point X, that is, the temperature of exhaust gas discharged from the internal combustion engine 1, is estimated in relation to the present state of operation, and the like. Then, the exhaust choke valves 24, 34 are controlled in accordance with the flow distribution determined from the estimated temperature. Although the exhaust choke valves 24, 34 are disposed downstream of the particulate filters A, B in the above-described embodiment, the exhaust choke valves 24, 34 may be disposed upstream of the particulate filters A, B.

The particulate filters A, B will next be described. The particulate filters A, B has an emission control effect of removing particulates, such as soot and the like, by the chemical reaction on the catalytic substance, as well as the capability for removing nitrogen oxides (NOx).

Figure 2:
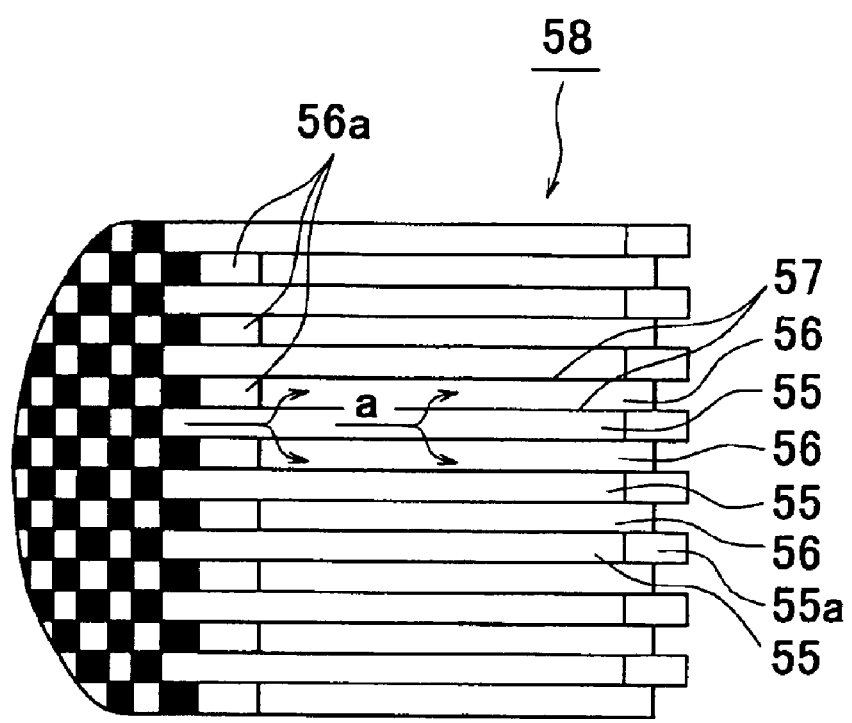
FIG. 2 is a diagram illustrating an internal structure of a particulate filter provided in the emission control apparatus.

As shown in FIG. 2, a filter base member 58 has a honeycomb configuration formed from a porous material such as cordierite, and has a plurality of flow paths 55, 56 that extend in parallel to one another. More specifically, the filter base member 58 has inflow exhaust gas passageways 55 whose downstream ends are closed by plugs 55a, and outflow exhaust gas passageways 56 whose upstream ends are closed by plugs 56a. The inflow exhaust gas passageways 55 and the outflow exhaust gas passageways 56 are arranged in vertical and horizontal directions in the filter base member 58 with thin partition walls 57.

Surfaces and internal pores of the partition walls 57 are provided with a layer of support formed from alumina ($Al_2O_3$) or the like. The support is loaded with a noble metal catalyst such as platinum (Pt) or the like, and an active oxygen releasing agent that absorbs oxygen if excess oxygen exists around the agent, and that releases stored oxygen in the form of active oxygen if the concentration of oxygen around the agent drops.

As the active oxygen releasing agent, it is appropriate to select at least one element from a group consisting of alkali metals, such as potassium (K), sodium (Na), lithium (Li), cesium (Cs), rubidium (Rb), etc., alkaline earth metals, such as barium (Ba), calcium (Ca), strontium (Sr), etc., rare earths, such as lanthanum (La), yttrium (Y), etc., and transition metals, such as cerium (Ce), tin (Sn), etc.

Furthermore, as the active oxygen releasing agent, it is more preferable to use an alkali metal or an alkaline earth metal that is higher in ionization tendency than calcium (Ca), that is, use potassium (K), lithium (Li), cesium (Cs), rubidium (Rb), barium (Ba), strontium (Sr), etc.

In the particulate filters A, B constructed as described above, exhaust gas flows in the order of the inflow exhaust gas passageways 55→the partition walls 57→the outflow exhaust gas passageways 56 (as indicated by arrows a in FIG. 2). Particulates present in exhaust gas, such as soot and the like, are trapped on or within the partition walls 57 during the process of passing through the partition walls 57. The particulates trapped by the partition walls 57 are oxidized by active oxygen, and eventually burn out without producing luminous flames. In this manner, trapped particulates are removed from the filter base member 58. The amount of active oxygen is increased by changing the oxygen concentration in exhaust gas that flows into the partition walls 57 (filter base member) over a plurality of times.

The action of removing nitrogen oxides (NOx) will next be described. The catalytic substance supported on the filter base member 58 has substantially the same composition as the catalytic substance supported on a well-known "storage-reduction type NOx catalyst". The removal of nitrogen oxides (NOx) in this embodiment is accomplished by substantially the same principle as the removal of NOx on the storage-reduction type NOx catalyst.

That is, each particulate filter absorbs nitrogen oxides (NOx) from exhaust gas when exhaust gas that flows into the filter base member 58 has high oxygen concentration. When inflowing exhaust gas has low oxygen concentration, that is, when the exhaust gas has low air-fuel ratio, the particulate filter causes the stored nitrogen oxides (NOx) to react with unburned fuel components (CO, HC) present in exhaust gas, thereby converting NOx into nitrogen ($N_2$), which is harmless.

The emission control action will be further described. In the lean-burn operation-capable internal combustion engine 1, combustion is normally conducted in an excess oxygen atmosphere. Therefore, the oxygen concentration in exhaust gas discharged in conjunction with engine combustion substantially never drops to a level that promotes the aforementioned release of active oxygen or the removal of nitrogen oxides (NOx).

In this embodiment, therefore, the reductant adding nozzles 21, 31 are used to inject and supply engine fuel (HC) as a reductant into exhaust gas, so that the oxygen concentration in exhaust gas is forcibly reduced, and therefore, active oxygen is released. Furthermore, in this manner, unburned components (HC) needed to remove nitrogen oxides (NOx) are supplied.

Figure 12:
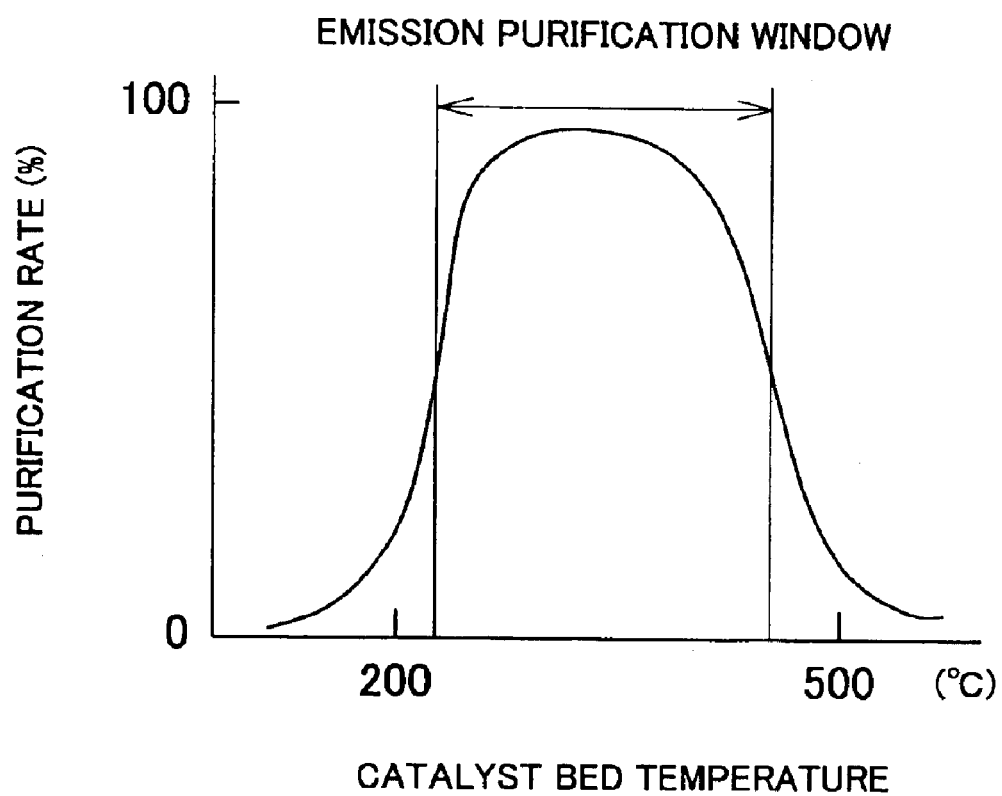
FIG. 12 is a diagram indicating a correlation between the emission purification rate and the catalyst bed temperature.

The particulate filters A, B remove nitrogen oxides (NOx) and particulates due to action of the catalytic substance. Therefore, management of the catalyst bed temperature is important. That is, the exhaust gas purification rate (emission purification rate) changes in accordance with the activity of the catalytic substance supported. Therefore, in order to achieve high purification rate, it is necessary to keep the catalyst bed temperature at an appropriate level as indicated in FIG. 12. In the description below, the catalyst bed temperature that allows high purification rate will be referred to as "emission purification window" in some cases.

In a case where there is no effect of external thermal energy on the particulate filters A, B, the catalyst bed temperature rises if high-temperature exhaust gas is supplied, and the catalyst bed temperature drops if low-temperature exhaust gas is supplied. That is, management of the catalyst bed temperature can be realized by adjustment of the temperature of exhaust gas. In other words, high purification rate can be achieved by feeding exhaust gas at an appropriate temperature. The appropriate exhaust gas temperature that allows high purification rate can be regarded as a "predetermined temperature condition".

However, since the temperature of exhaust gas that flows into the particulate filters changes greatly depending on the state of operation of the internal combustion engine 1, the exhaust gas temperature sometimes deviates from the temperature range that allows high purification rate (hereinafter, referred to as "purification temperature range").

Therefore, if the temperature of exhaust gas that flows into the particulate filters deviates from the "purification temperature range" as indicated in FIG. 13, for example, if the temperature of inflow exhaust gas is excessively low (e.g., temperature Tc in FIG. 13), or is excessively high (e.g., temperature Th in FIG. 13), the catalyst bed temperature of the particulate filters deviates from the emission purification window, so that the purification rate greatly drops as indicated in a right side portion or a left side portion of the purification rate curve in FIG. 12.

In this embodiment, the reduction in the emission purification rate in association with changes in exhaust gas temperature is curbed by adopting the split passageways 20, 30 that have different pipe lengths from the branch point X to the particulate filters A, B, and adjusting the amount of flow of exhaust gas into the split passageways 20, 30 through the use of the exhaust choke valves 24, 34.

The effect achieved by the different pipe lengths and the flow control will be described with reference to emission purification rate characteristic diagrams shown in FIGS. 3 to 7.

For convenience in the description below, the particulate filter A disposed in the split passageway 20 of less heat release will be simply referred to as "catalyst A", and the particulate filter B disposed in the split passageway 30 of greater heat release will be simply referred to as "catalyst B" in some cases. Furthermore, the exhaust gas that flows into the particulate filters A, B via the split passageways 20, 30 may be referred to as "inflow exhaust gas".

Figure 3:
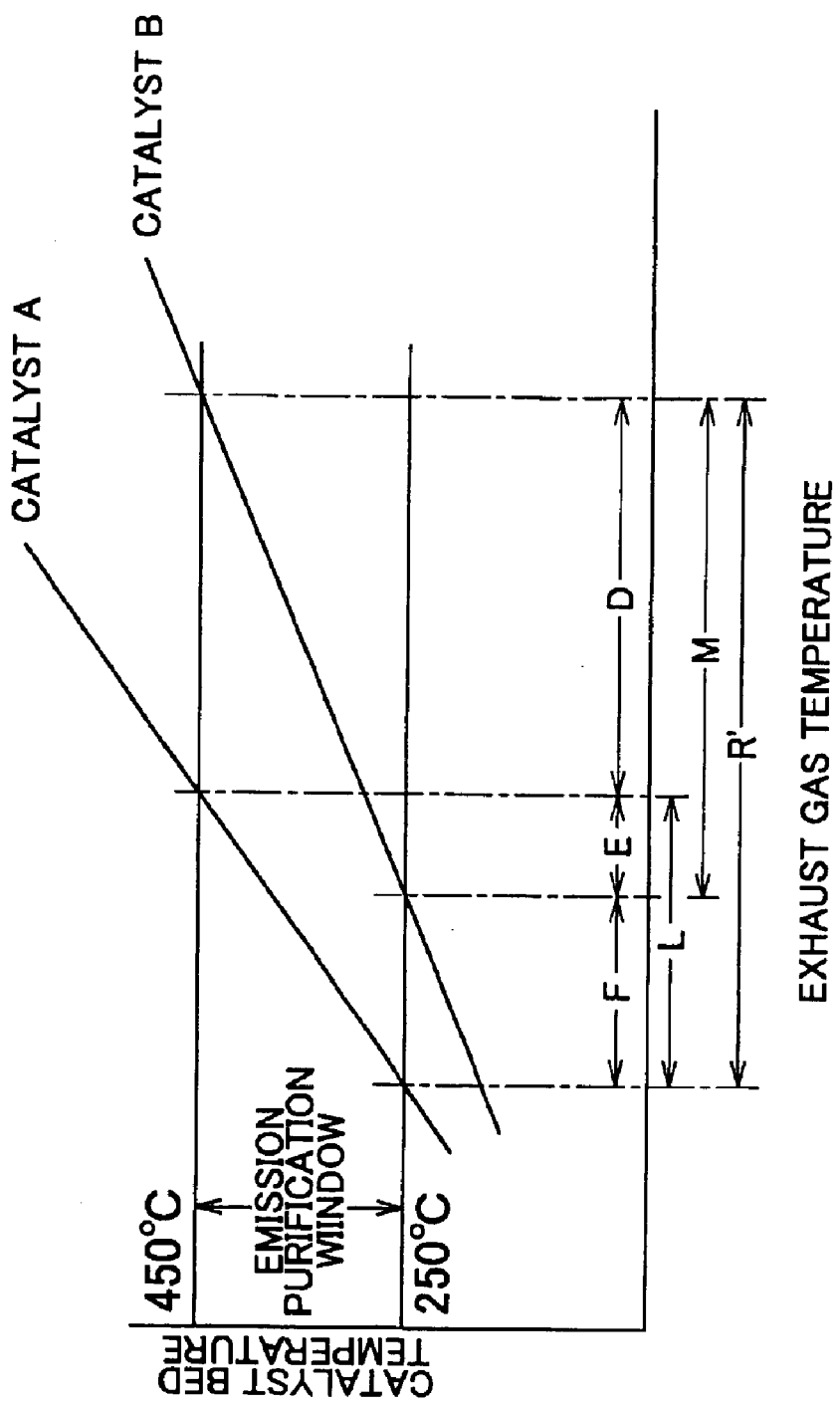
FIG. 3 is a diagram indicating emission purification characteristics of particulate filters with different pipe lengths from the branch point.

First, the effect achieved by the different pipe lengths from the branch point X to the particulate filters A, B will be described with reference to an emission characteristic diagram shown in FIG. 3. The emission purification characteristic indicated in FIG. 3 is an exhaust characteristic where the amount of flow of exhaust gas that flows into the catalyst A equals the amount of flow of exhaust gas that flows into the catalyst B.

If the pipe lengths up to the catalysts A, B are different from each other, the amount of heat release in the split passageways 20, 30 are different, so that the temperatures of exhaust gas that flows into the catalysts A, B are different despite the temperature of exhaust gas that flows to the branch point X. Therefore, the catalyst A and the catalyst B have different catalyst bed temperatures (see the vertical axis of the diagrams). In this embodiment, the split passageway 20 connected to the catalyst A is a split passageway in which less heat release occurs, and the split passageway 30 connected to the catalyst B is a split passageway in which greater heat release occurs. Therefore, as indicated in the emission purification characteristic diagrams shown in FIG. 3, the temperature of the catalyst B is lower than the temperature of the catalyst A.

The emission purification characteristic will next be described. (i) If the temperature of exhaust gas that flows to the branch point X is within a range E, both catalysts A, B have appropriate catalyst bed temperature, and achieve high purification rate. (ii) If the temperature of exhaust gas that flows to the branch point X is within a range F, only the catalyst A has an appropriate catalyst bed temperature, and achieves high emission purification rate. (iii) If the temperature of exhaust gas that flows to the branch point X is within a range D, only the catalyst B has an appropriate catalyst bed temperature, and achieves high emission purification rate.

In view of each catalyst, (iv) the catalyst A achieves high purification rate if the temperature of exhaust gas that flows to the branch point X is within a range (F+E), and (v) the catalyst B achieves high purification rate if the temperature of exhaust gas that flows to the branch point X is within a range (E+D). Furthermore, (vi) in the whole emission control apparatus 10, high purification rate is achieved by only the catalyst A, or only the catalyst B, or both catalysts A, B if the temperature of exhaust gas that flows to the branch point X is within a range (E+F+D).

In the description below, the exhaust gas temperature range where high purification rate can be achieved will be referred to as "purification temperature range"). As for the catalyst A, a purification temperature range L for the catalyst A is defined by the range F+E. As for the catalyst B, a purification temperature range M is defined by the range E+D. As for the whole emission control apparatus 10, a purification temperature range is defined by the range (E+F+D).

Thus, due to the different pipe lengths of the split passageways 20, 30 to the particulate filters A, B, emission control can be performed in non-overlapped ranges (range F, range D) where emission control is possible on only one of the particulate filters, and an overlapped range (range E) where emission control is performed by both particulate filters. Thus, the purification temperature range R' is enlarged to both the low temperature side and the high temperature side, in comparison with the emission purification characteristic indicated in FIG. 13. Therefore, if the engine 1 discharges exhaust gas having a temperature that does not allow high purification rate according to the known art, exhaust gas purification at high purification rate can be realized by at least one of the particulate filters A, B because of the enlarged purification temperature range R' achieved by the different pipe lengths.

In the experiments of the present inventors, when the pipe lengths of the split passageways 20, 30 were set so that the exhaust gas temperature difference between the split passageways 20, 30 became at least 50° C., exhaust gas purification at high purification rate was accomplished by an emission control catalyst for mainly removing particulates and nitrogen oxides as mentioned above, in normally conceivable states of operation.

Next described will be the effect achieved by varying the amounts of flow of exhaust gas into the split passageways 20, 30 from each other through the use of the exhaust choke valves 24, 34.

Prior to the detailed description of the flow control, the background of the need for the flow control will be described. In this embodiment, the purification temperature range is broadened by varying the pipe lengths to the catalysts A, B from each other. In the range F and the range D in FIG. 3, exhaust gas purification is performed by one of the catalysts A, B. Therefore, it can be said that the range F and the range D provide lower purification rates than the range E where emission purification can be performed by both catalysts A, B.

If the temperature of exhaust gas that flows to the branch point X deviates from the range F to the lower temperature side, or deviates from the range D to the higher temperature side, both catalysts A, B are outside the emission purification window.

The exhaust gas purification rate will be considered in terms of the amount of purification performed by the entire emission control apparatus 10, that is, "throughput". If the amount of flow of exhaust gas into the well-activated catalysts (particulate filters) is increased, the throughput increases, so that the purification rate of the entire emission control apparatus will improve. More specifically, the aforementioned throughput corresponds to a total amount of purification object components (e.g., soot) that can be processed by the emission control apparatus 10 (total amount of purification) per unit time.

Taking the above-described background into consideration, the embodiment realizes further improved purification rate by adjusting the amounts of flow of exhaust gas into the split passageways 20, 30 to optimal amounts requested.

An example of the control of the exhaust choke valves 24, 34 will be described below. As for a first flow control, in a case where the temperature of exhaust gas flowing to the branch point X is outside the purification temperature range corresponding to one of the catalysts A, B, and where the temperatures of exhaust gas that flows to the catalysts A, B can be brought into and kept within the purification temperature range of the catalysts by executing the flow control, the electronic control unit 40 controls the exhaust choke valves 24, 34, as a flow control, so as to increase the amount of flow of exhaust gas into the split passageway 30 of greater heat release (toward the catalyst B).

Figure 4:
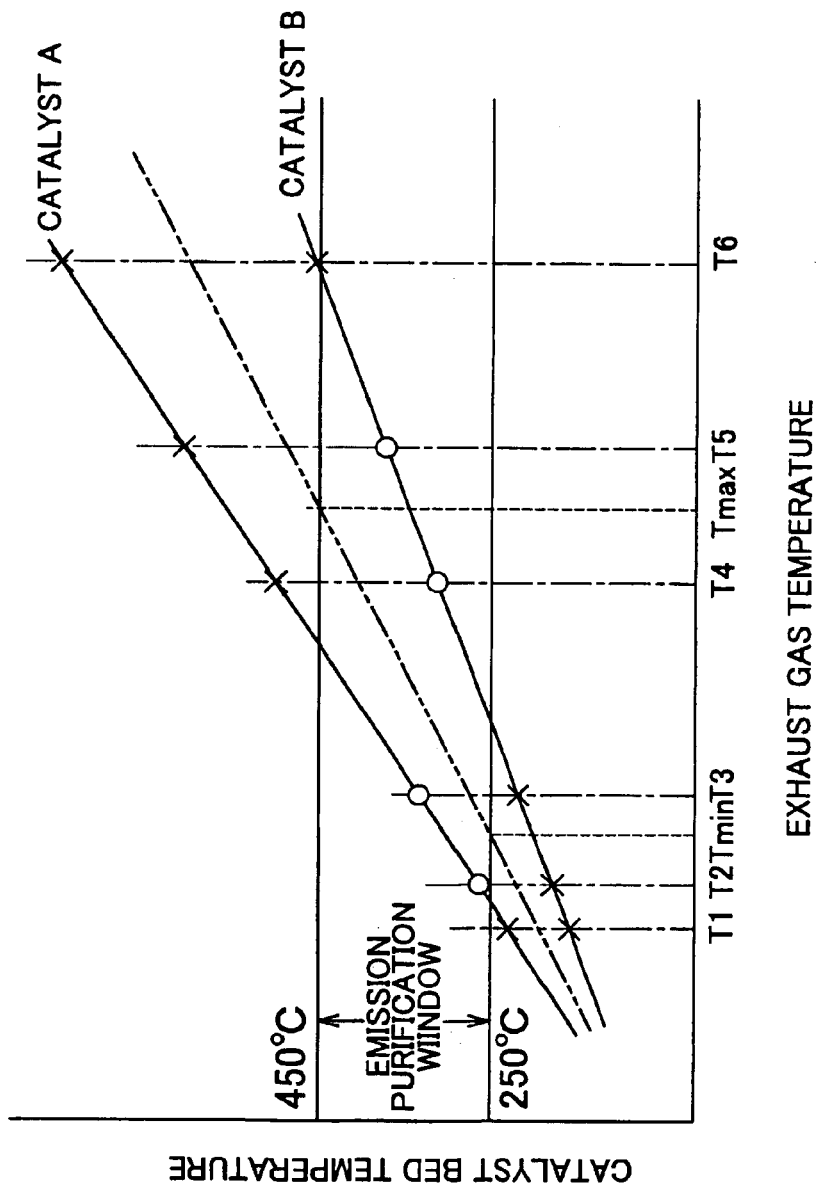
FIG. 4 is a diagram for illustrating correlations between the temperature of exhaust gas that flows to the branch point; and the catalyst bed temperatures of the particulate filters.

More specifically, if the exhaust gas temperature is such a temperature (e.g., temperature T3, temperature T4) that the temperature of one of the catalysts A, B is outside the emission purification window as indicated in FIG. 4, and such that the temperatures of the particulate filters can be brought into the emission purification window by executing the flow control, the electronic control unit 40 performs the flow control of increasing the opening of the exhaust choke valve 34 or decreasing the opening of the exhaust choke valve 24 in order to increase the amount of flow of exhaust gas into the split passageway 30 of greater heat release (toward the catalyst B).

The above exemplification of the temperature T3 and the temperature T4 is related to a condition that "the temperatures of the catalysts A, B can be brought into the emission purification window by executing the flow control", which will be described later.

As for a second flow control, in a case where the temperature of exhaust gas flowing to the branch point X is outside the purification temperature range corresponding to one of the catalysts A, B, and where the temperature of exhaust gas that flows to the catalysts A, B cannot be brought into and kept within the purification temperature range for the catalysts by executing the flow control, the electronic control unit 40 controls the exhaust choke valves 24, 34 so as to increase the amount of flow of exhaust gas into the catalyst A or B that presently has high purification rate by such an amount of increase that the temperature of exhaust gas that flows to the catalyst A or B remains within the purification temperature range.

More specifically, in the case where the temperature of one of the catalysts A, B is outside the emission purification window and where the temperature of the one of the catalysts A, B cannot be brought into the emission purification window by the flow control, for example, in the case where the exhaust gas temperature is T2 or T5, the amount of flow of exhaust gas is changed as follows. That is, if the exhaust gas temperature is T2, the amount of flow of exhaust gas that flows to the catalyst A, which presently has high purification rate, is increased. If the exhaust gas temperature is T5, the amount of flow of exhaust gas that flows to the catalyst B, which presently has high purification rate, is increased.

The above exemplification of the temperature T2 and the temperature T5 is related to a condition that "the temperature of the catalyst A or B cannot be brought into the emission purification window by executing the flow control", which will be described later together with the first flow control.

As a third flow control, in a case where the temperature of exhaust gas flowing to the branch point X is outside the purification temperature ranges for the catalysts A, B and where the temperature of exhaust gas that flows to one of the catalysts A, B can be kept within the purification temperature range for the one of the catalysts A, B by the flow control, the actuator 50 controls the exhaust choke valves 24, 34 as the flow control, so as to increase the amount of flow of exhaust gas into the split passageway 20 of less heat release (toward the catalyst A).

More specifically, if the exhaust gas temperature is such a temperature that the temperatures of the catalysts A, B are both outside the emission purification window and such that the temperature of one of the catalysts A, B can be brought into the emission purification window by executing the flow control (for example, if the exhaust gas temperature is T1 or T6), the electronic control unit 40 performs the flow control of decreasing the opening of the exhaust choke valve 34 and increasing the opening of the exhaust choke valve 24 so as to increase the amount of flow of exhaust gas into the split passageway 20 of less heat release (toward the catalyst A). That is, the electronic control unit 40 performs a control operation that is opposite to that of the first flow control.

Thus, in this embodiment, the exhaust choke valves 24, 34 are controlled in accordance with the exhaust gas temperature, so as to improve the emission purification rate. The operation and advantages achieved by the first to third flow controls will be described below with reference to the drawings.

Figure 5:
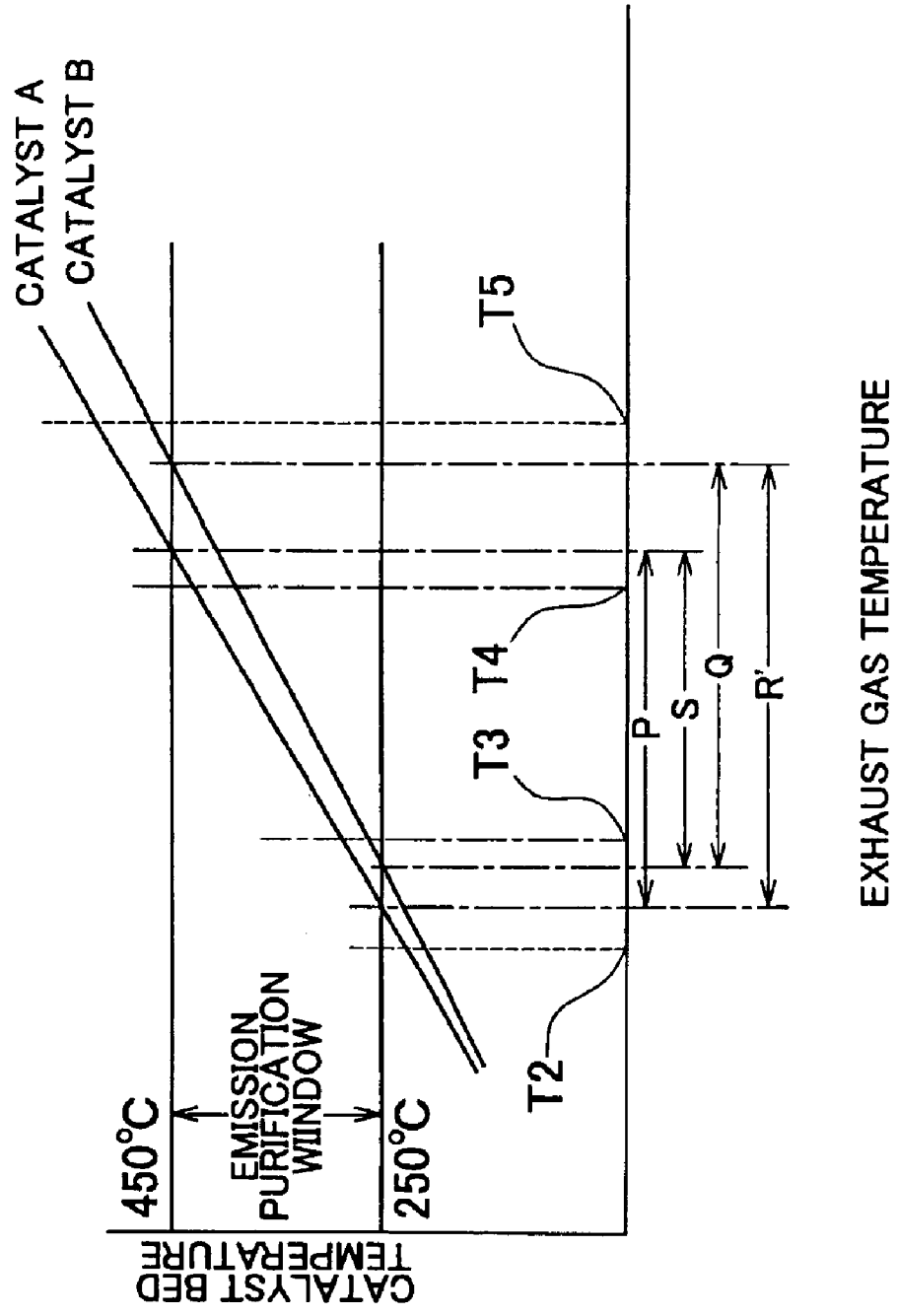
FIG. 5 is a diagram indicating emission purification characteristics of the particulate filters after execution of a first flow control in the embodiment.

As for the first flow control, due to the increase of the amount of inflow of exhaust gas to the split passageway 30 of greater heat release, the temperature of the catalyst B increases as indicated in FIG. 5. As for the catalyst A disposed in the split passageway 20 of less heat release, the catalyst bed temperature decreases due to a decrease in the amount of flow of exhaust gas. That is, the purification temperature range L corresponding to the catalyst A indicated in FIG. 3 is re-set toward the high temperature side (shifted to a range P in FIG. 5), and the purification temperature range M corresponding to the catalyst B indicated in FIG. 3 is re-set toward the low temperature side (shifted to a range Q in FIG. 5).

Therefore, the purification temperature range R' for the entire emission control apparatus 10 is narrowed from the purification temperature range provided prior to the flow control. However, a range S where the purification temperature ranges P, Q overlap, that is, the "overlapped range" S, is broadened from the overlapped range (the range E in FIG. 3) provided prior to the flow control. As a result, the temperatures T3 and T4 are within the overlapped range S.

Therefore, emission purification can be performed by the catalysts A, B if the exhaust gas temperature is T3 or T4, as well.

A process condition in the first flow control is that "the temperature of exhaust gas flowing to the branch point X is outside the purification temperature range corresponding to one of the catalysts A, B". This condition is also satisfied if the exhaust gas temperature is T2, T5.

However, if the first flow control is executed at the temperature T2 or the temperature T5, the temperatures of the catalysts A, B are both outside the emission purification window, thus leading to a reduced purification rate. Therefore, in order to avoid this phenomenon, this embodiment performs the second flow control if the temperature of exhaust gas flowing to the branch point X is within a range that contains the temperature T2 or the temperature T5. Considering this, execution of the first flow control requires an additional condition that "the temperatures of the catalysts A, B can be brought into the emission purification window by executing the flow control", that is, the temperature of exhaust gas that flows to the catalysts A, B can be kept within the purification temperature ranges for the catalysts A, B by executing the flow control.

The threshold value needed for the changing between the first flow control and the second flow control changes depending on the width of change in the catalyst bed temperature caused by the control of the exhaust choke valves 24, 34, and the heat release characteristics of the split passageways 20, 30. Therefore, the threshold value is set at a proper value based on various preliminary experiments.

Theoretical values of the threshold can be set at a theoretical value with reference to FIG. 4 as follows. In the flow control in which the temperature of exhaust gas that flows to the catalyst A and the temperature of exhaust gas that flows to the catalyst B become equal (see two-dot chain lines in FIG. 4), the lowest temperature in the overlapped range is set as a low temperature-side limit threshold value Tmin (see FIG. 4), and the highest temperature in the overlapped range is set as a high temperature-side limit threshold value Tmax (see FIG. 4).

Next, the second flow control will be described in detail. The second flow control is executed in the exhaust gas temperature range (e.g., temperature T2, temperature T5) where execution of the first flow control will reduce the emission purification rate. The second flow control increases the amount of flow of exhaust gas to the catalyst that presently has high purification rate, and therefore increases the throughput of the entire emission control apparatus 10 (total amount of purification). Thus, the emission purification rate is improved.

Figure 6:
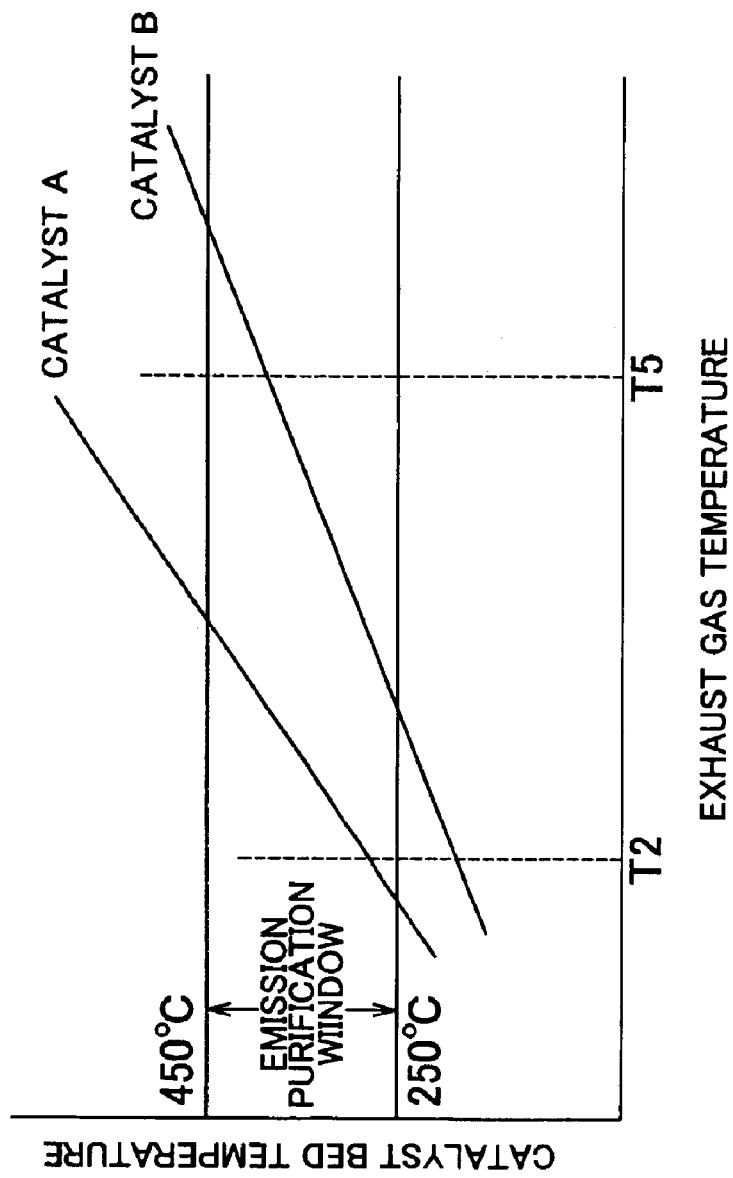
FIG. 6 is a diagram indicating emission purification characteristics of the particulate filters after execution of a second flow control in the embodiment.

If the exhaust gas temperature is T2, the temperature of the catalyst A is within the emission purification window as indicated in FIG. 6. In this case, therefore, the amount of flow of exhaust gas into the catalyst A is increased so as to increase the amount of purification. If the exhaust gas temperature is T5, the temperature of the catalyst B is within the emission purification window. In this case, therefore, the amount of flow of exhaust gas into the catalyst B is increased so as to increase the amount of purification. That is, by increasing the amount of flow of exhaust gas into the catalyst A or B that presently has high purification rate, the amount of emission control-object components processed can be increased. As a result, the purification rate of the entire emission control apparatus 10 can be improved.

A processing condition in the second flow control is that "the amount of flow of exhaust gas to one of the catalysts A, B that presently has high purification rate is increased by such an amount that the temperature of exhaust gas that flows to the catalyst A or B remains within the purification temperature range for the catalyst A or B". A reason for adopting this condition is that an excessive increase in the amount of flow of exhaust gas excessively raises the catalyst bed temperature so that the catalyst bed temperature deviates from the emission purification window and therefore the purification rate drops. That is, for the purpose of avoiding this phenomenon, the additional condition that "the purification rate not be reduced" is provided.

Figure 7:
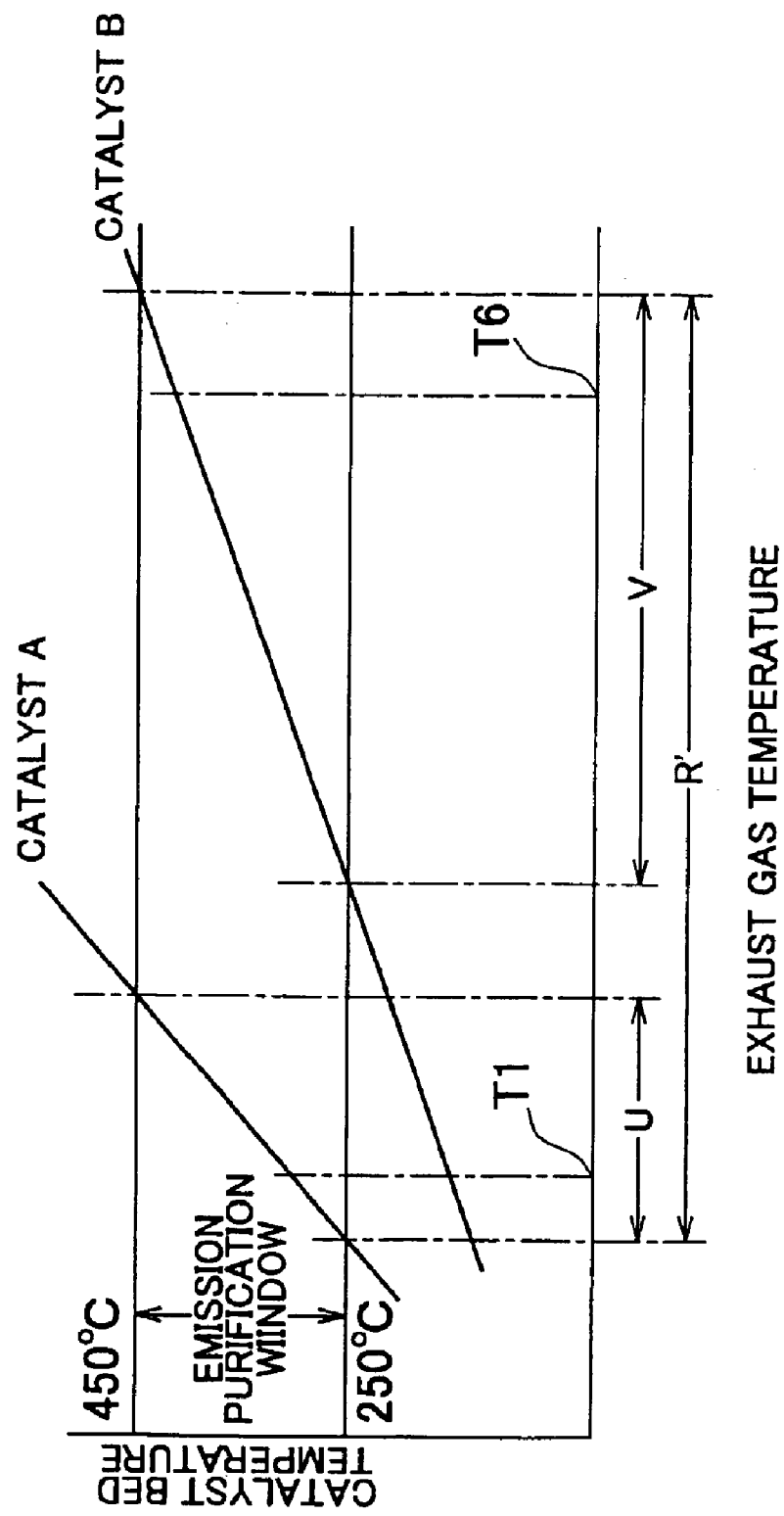
FIG. 7 is a diagram indicating emission purification characteristics of the particulate filters after execution of a third flow control in the embodiment.

Next, the third flow control will be described with reference to FIG. 7. In the third flow control, due to the increase of the amount of flow of exhaust gas into the split passageway 20 of less heat release, the bed temperature of the catalyst A rises as indicated in FIG. 7. On the other hand, the bed temperature of the catalyst B disposed in the split passageway 30 of greater heat release drops due to a decrease in the amount of flow of exhaust gas. Therefore, the purification temperature range L corresponding to the catalyst A indicated in FIG. 3 is re-set toward the low temperature side (shifted to a range U in FIG. 7), and the purification temperature range M corresponding to the catalyst B indicated in FIG. 3 is re-set toward the high temperature side (shifted to a range V in FIG. 7).

Therefore, if the exhaust gas temperature is in a range that contains the temperature T1 or the temperature T6, the temperature of one of the catalysts A, B is outside the emission purification window, but the bed temperature of the other one of the catalysts A, B is within the emission purification window due to the shift of the purification temperature range. Hence, even in the case where the exhaust gas that flows to the branch point X has a temperature that is in a range where the exhaust gas purification rate normally drops to a considerable extent, for example, the temperature T1 or the temperature T6, emission control is reliably performed by one of the catalysts A, B.

Thus, in the emission control apparatus 10 of this embodiment, the purification temperature range R' of the entire emission control apparatus 10 is expanded by varying the pipe lengths from the branch point X to the particulate filters A, B from each other. Furthermore, in exhaust gas temperature ranges where the emission purification rate normally drops, the emission purification rate is improved by executing the above-described flow control. In view of the relationship between the flow control and the amount of heat release, the synergetic effect thereof allows provision of a great exhaust gas temperature difference between the split passageways 20, 30. In this respect, too, exhaust gas purification can be performed at high purification rate over broad operational regions.

The foregoing embodiment is merely an exemplary embodiment that may be modified within the scope of the technical idea of the invention. That is, it is not altogether necessary to provide all the above-described elements in carrying out the invention.

Figure 8:
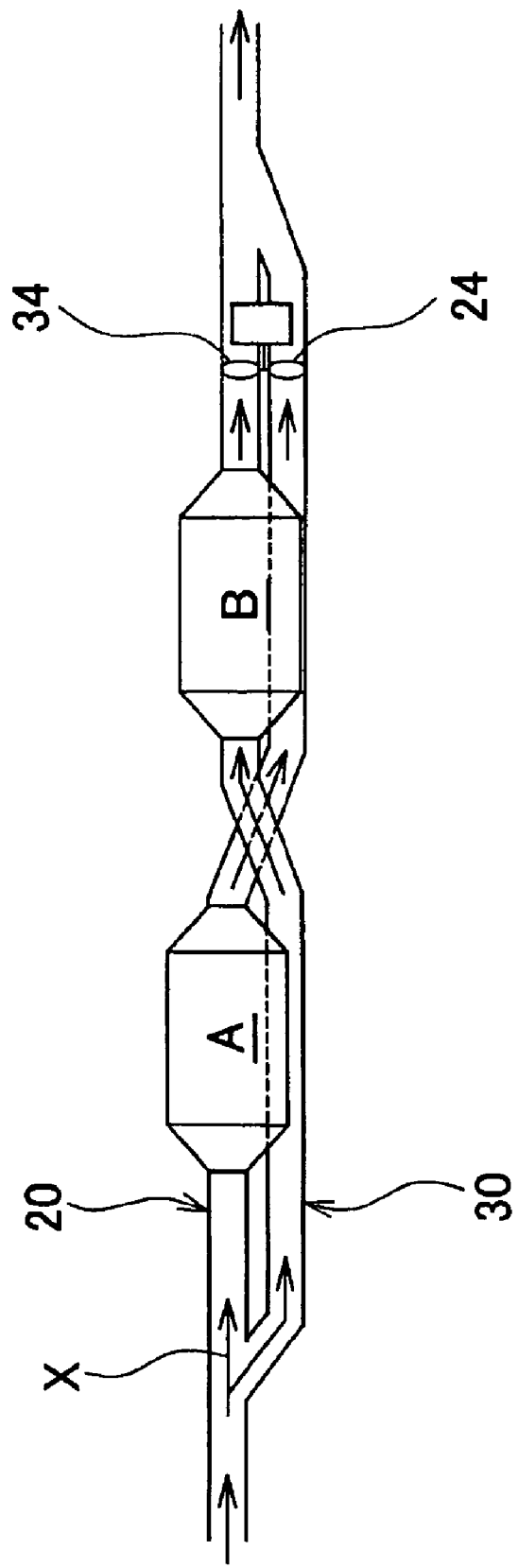
FIG. 8 is a diagram showing another layout of the particulate filters.

As for modifications of the embodiment, it is possible to modify, for example, the layout of the split passageways, the positions of the particulate filters, the number of split passageways, etc. in accordance with needs. For example, a layout of split passageways as shown in FIG. 8 is conceivable. The layout shown in FIG. 8 is advantageous if the emission control apparatus of the invention is installed in a space below a floor member of a vehicle, or a frame of a vehicle.

In FIG. 8, the particulate filters A, B on the respective split passageways are disposed at different distances from the branch point X in the direction of the split passageways. Furthermore, the particulate filter A disposed relatively close to the branch point X and the particulate filter B disposed relatively remote from the branch point X are coaxially disposed.

Since the particulate filters A, B are disposed at a certain distance from each other on a single axis, interference of side portions of the particulate filters with vehicle body portions is avoided. Thus, an advantage of this layout is that installation of the emission control apparatus 10 in the aforementioned space or site in a vehicle becomes easy.

Furthermore, although in the foregoing embodiment, the amounts of heat release from exhaust gas in the split passageways 20, 30 are varied from each other by the different pipe lengths from the branch point X to the particulate filters A, B, the amounts of heat release in the split passageways 20, 30 may be varied by different sectional shapes of the split passageways 20, 30.

Figure 9:
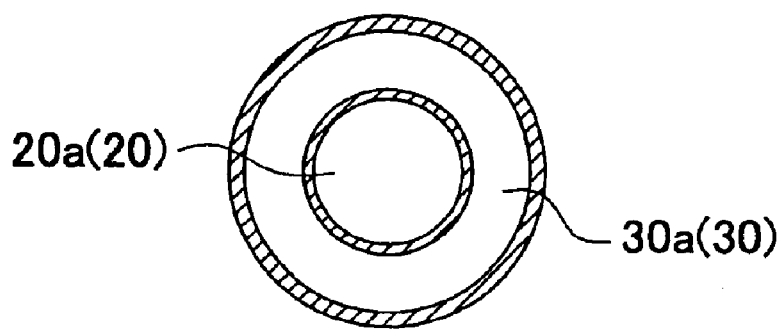
FIG. 9 is a diagram illustrating an arrangement of split passageways having different sectional shapes.
Figure 10:
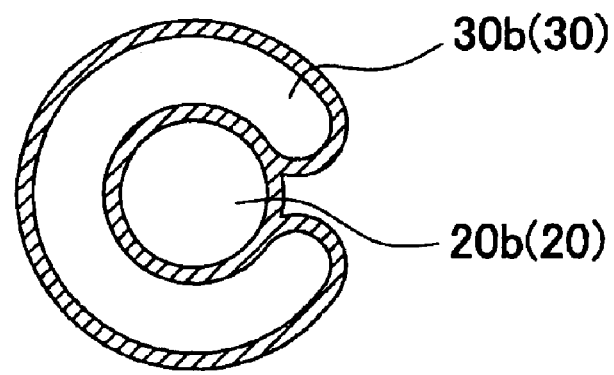
FIG. 10 is a diagram illustrating another arrangement of split passageways having different sectional shapes.

For example, if a double-pipe structure is adopted for an exhaust passageway (exhaust pipe) as shown in FIG. 9, an outer passageway 30a can be regarded as a split passageway 30 of greater heat release. An inner passageway 20a can be regarded as a split passageway 20 of less heat release.

Furthermore, if an exhaust passageway 30b has a "U" sectional shape and an exhaust passageway 20b having a circular sectional shape extends on an inner side of the exhaust passageway 30b, the exhaust passageway 30b forms a split passageway 30 of greater heat release, and the exhaust passageway 20b forms a split passageway 20 of less heat release.

Still further, the amounts of heat release in split passageways can be varied from each other by forming one of the split passageways from a thick-wall pipe, or adopting a double-pipe structure for one of the split passageways, or providing radiator fins on one of the split passageways, etc.

The measure for varying the catalyst bed temperatures of the particulate filters A, B from each other is not limited to the varying of the amounts of heat release in the split passageways. For example, the casing of the particulate filter A or B may be wrapped with a heat insulating material, or may be provided with radiator fins.

Although the foregoing embodiment adopts the particulate filters A, B that achieve high purification rate in the same catalyst bed temperature range, it is also possible to adopt a combination of an emission control catalyst that achieves high purification rate at high catalyst bed temperature and that is provided in a split passageway, and an emission control catalyst that achieves high purification rate at low catalyst bed temperature and that is provided in another split passageway. In this case, it is desirable that the emission purification window of the emission control catalyst that achieves high purification rate at high catalyst bed temperature and the emission purification window of the emission control catalyst that achieves high purification rate at low catalyst bed temperature overlap partially with each other.

Although the foregoing embodiment adopts the particulate filters as emission control catalysts, this is not restrictive. The kinds and combination of emission control catalysts are arbitrary. For example, it is possible to adopt a combination of a particulate filter and a well-known storage-reduction type NOx catalyst. That is, the emission control catalyst in this invention may be any emission control catalyst as long as the catalyst achieves high purification rate at the time of inflow of exhaust gas having a temperature within the purification temperature range.

In the foregoing embodiment, the catalyst bed temperatures of the particulate filters A, B are varied from each other by varying the pipe lengths to the particulate filters A, B from each other, and adjusting the amounts of inflow of exhaust gas to the split passageways 20, 30. However, in view of securing a broad purification temperature range, it is not necessary to provide both measures. Adoption of only one of the two measures still allows expansion of the purification temperature range.

Since the expansion of the purification temperature range by different pipe lengths (different amounts of heat release) has been described above, the expansion of the purification temperature range by the flow control will be described below with reference to the emission purification characteristic indicated in FIG. 11.

Figure 11:
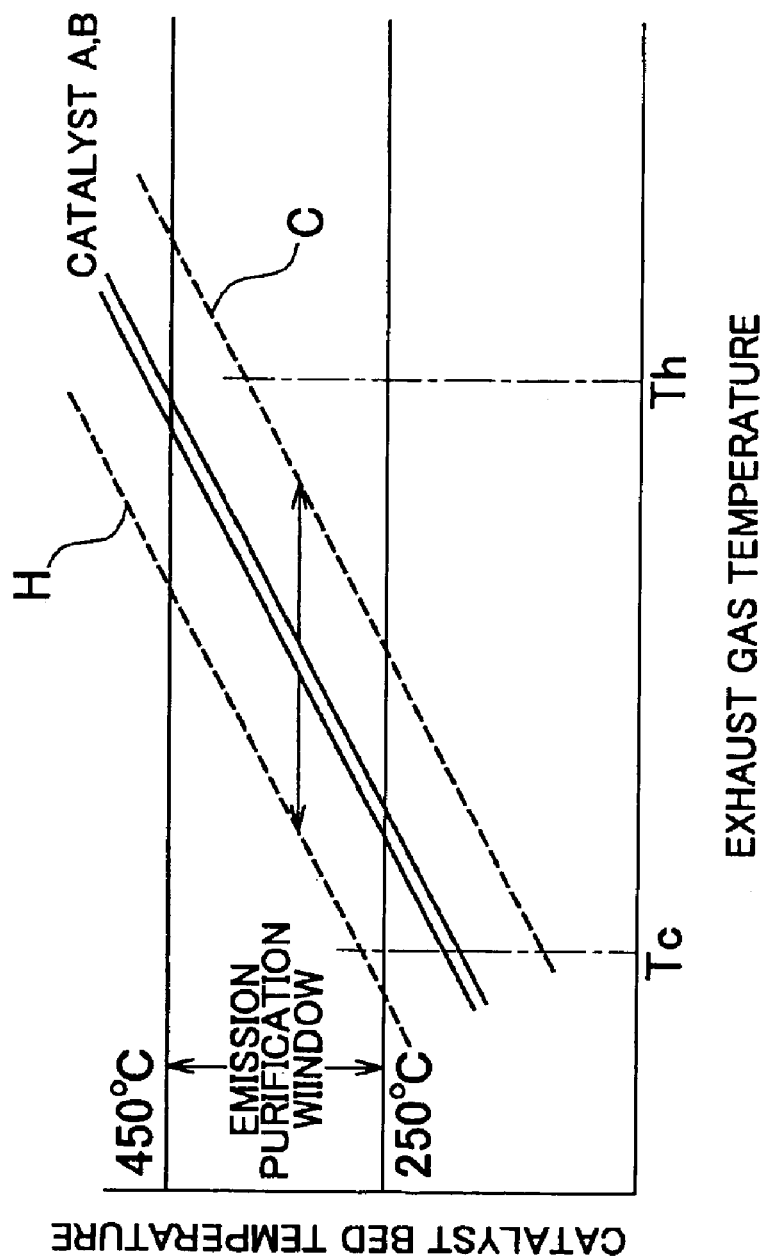
FIG. 11 is a diagram for illustrating changes in the emission purification characteristic depending only on the flow control.

In an emission purification characteristic diagram where the pipe lengths to the catalysts A, B are equal, the purification temperature range for the catalyst A and the purification temperature range for the catalyst B coincide with each other as indicated in FIG. 11 (indicated by two lines in FIG. 11 for convenience in illustration). If the flow proportion is changed from this state, the purification temperature range for the catalyst in the split passageway with an increased flow shifts toward the low temperature side (see a dotted line H in FIG. 11), and the purification temperature range for the catalyst in the split passageway with a reduced flow shifts toward the high temperature side (see a dotted line C in FIG. 11). Therefore, if the internal combustion engine 1 discharges exhaust gas having a temperature outside the purification temperature range for the catalysts A, B occurring prior to the flow control, for example, a temperature Tc, or a temperature Th in FIG. 11, the exhaust gas can be purified at high purification rate by one of the catalysts. Thus, the purification temperature range can also be expanded by only the changing of the amount of flow of exhaust gas.

As is apparent from the foregoing description, according to the invention, it is possible to provide an internal combustion engine emission control technology capable of controlling emission in a broadened range of changing temperature of exhaust gas. Furthermore, it is possible to provide an internal combustion engine emission control technology that is able to perform emission control while avoiding reduction in the emission purification rate as much as possible even in a situation where the emission purification rate normally drops.

In the illustrated embodiment, the controller (the ECU 40) is implemented as a programmed general purpose electronic control unit. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to exemplary embodiments thereof, it is to be understood that the invention is not limited to the preferred embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. An engine emission control apparatus comprising:
   split passages that divide an exhaust gas discharged from an engine into a plurality of streams, the exhaust gas flowing simultaneously into the split passages;
   emission control catalysts provided individually in the split passages, and that remove a component present in the exhaust gas at a high removal rate if a temperature of the exhaust gas that inflows via the split passages satisfies a predetermined temperature condition;
   a heat dissipater that varies amounts of heat released from the exhaust gas in paths of the split passages from a branch point to the emission control catalysts; and
   a controller that changes proportions of amounts of flow of the exhaust gas into the split passages so that the predetermined temperature condition is satisfied in at least one of the split Passages, wherein:
      the controller changes the proportions of the amounts of flow of the exhaust gas into the split passages based on a temperature of the exhaust gas upstream of the branch point of the split passages, and
      if the temperature of the exhaust gas that flows to the branch point does not satisfy the predetermined temperature condition of one of the emission control catalysts, and the temperatures of inflows of the exhaust gas to one of the emission control catalysts and to another emission control catalyst can be controlled by a flow control of the controller so as to satisfy the predetermined temperature condition,
      the controller changes the proportions of the amounts of flow of the exhaust gas into the split passages so as to increase the amount of flow of the exhaust gas into a split passage of greater heat release.

2. An engine emission control apparatus comprising:
   split passages that divide an exhaust gas discharged from an engine into a plurality of streams, the exhaust gas flowing simultaneously into the split passages;
   emission control catalysts provided individually in the split passages, and that remove a component present in the exhaust gas at a high removal rate if a temperature of the exhaust gas that inflows via the split passages satisfies a predetermined temperature condition;
   a heat dissipater that varies amounts of heat released from the exhaust gas in paths of the split passages from a branch point to the emission control catalysts; and
   a controller that changes proportions of amounts of flow of the exhaust gas into the split passages so that the predetermined temperature condition is satisfied in at least one of the split passages, wherein:
      the controller changes the proportions of the amounts of flow of the exhaust gas into the split passages based on a temperature of the exhaust gas upstream of the branch point of the split passages, and
      if the temperature of the exhaust gas that flows to the branch point does not satisfy the predetermined temperature condition of one of the emission control catalysts, and the temperatures of inflows of the exhaust gas to one of the emission control catalysts and to another emission control catalyst cannot be controlled so as to satisfy the predetermined temperature condition even by increasing the amount of the exhaust gas that flows into a split passage of greater heat release, the controller increases the amount of flow of the exhaust gas to the emission control catalyst that presently has a high removal rate such that the temperature of the exhaust gas that flows into the emission control catalyst continues to satisfy the predetermined temperature condition.

3. An engine emission control apparatus comprising:

split passages that divide an exhaust gas discharged from an engine into a plurality of streams, the exhaust gas flowing simultaneously into the split passage;

emission control catalysts provided individually in the split passages, and that remove a component present in the exhaust gas at a high removal rate if a temperature of the exhaust gas that inflows via the split passages satisfies a predetermined temperature condition;

a heat dissipater that varies amounts of heat released from the exhaust gas in paths of the split passages from a branch point to the emission control catalysts; and a controller that changes proportions of amounts of flow of the exhaust gas into the split passages so that the predetermined temperature condition is satisfied in at least one of the split passages, wherein:

the controller changes the proportions of the amounts of flow of the exhaust gas into the split passages based on a temperature of the exhaust gas upstream of the branch point of the split passages, and if the temperature of the exhaust gas that flows to the branch point does not satisfy the predetermined temperature condition of both of the emission control catalysts, and the temperature of the exhaust gas that flows into one of the emission control catalysts can be controlled by a flow control of the controller so as to satisfy the predetermined temperature condition, the controller changes the proportions of the amounts of flow of the exhaust gas into the split passages so as to increase the amount of the flow of the exhaust gas into a split passage of less heat release.

4. An engine emission control apparatus comprising:

split passages that divide an exhaust gas discharged from an engine into a plurality of streams, the exhaust gas flowing simultaneously into the split passages;

emission control catalysts provided individually in the split passages, and that remove a component present in the exhaust gas at a high removal rate if a temperature of the exhaust gas that inflows via the split passages satisfies a predetermined temperature condition;

a heat dissipater that varies amounts of heat released from the exhaust gas in paths of the split passages from a branch point to the emission control catalysts; and a controller that changes proportions of amounts of flow of the exhaust gas into the split passages so that the predetermined temperature condition is satisfied in at least one of the split passages, wherein:

if the temperature of the exhaust gas that flows to the branch point does not satisfy the predetermined temperature condition of one of the emission control catalysts, and the temperatures of inflows of the exhaust gas to one of the emission control catalysts and to another emission control catalyst can be controlled by a flow control of the controller so as to satisfy the predetermined temperature condition, the controller changes the proportions of the amount of flow of the exhaust gas into the split passages so as to increase the amount of flow of the exhaust gas into a split passage of greater heat release.

5. An engine emission control apparatus comprising:

split passages that divide an exhaust gas discharged from an engine into a plurality of streams, the exhaust gas flowing simultaneously into the split passages;

emission control catalysts provided individually in the split passages, and that remove a component present in the exhaust gas at a high removal rate if a temperature of the exhaust gas that inflows via the split passages satisfies a predetermined temperature condition;

a heat dissipater that varies amounts of heat released from the exhaust gas in paths of the split passages from a branch point to the emission control catalysts; and a controller that changes proportions of amounts of flow of the exhaust gas into the split passages so that the predetermined temperature condition is satisfied in at least one of the split passages, wherein:

if the temperature of the exhaust gas that flows to the branch point does not satisfy the predetermined temperature condition of one of the emission control catalysts, and the temperatures of inflows of the exhaust gas to one of the emission control catalysts and to another emission control catalyst cannot be controlled so as to satisfy the predetermined temperature condition even by increasing the amount of the exhaust gas that flows into a split passage of greater heat release, the controller increases the amount of flow of the exhaust gas to the emission control catalyst that presently has a high removal rate such that the temperature of the exhaust gas that flows into the emission control catalyst continues to satisfy the predetermined temperature condition.

6. An engine emission control apparatus comprising:

split passages that divide an exhaust gas discharged from an engine into a plurality of streams, the exhaust gas flowing simultaneously into the split passages;

emission control catalysts provided individually in the spilt passages, and that remove a component present in the exhaust gas at a high removal rate if a temperature of the exhaust gas that inflows via the split passages satisfies a predetermined temperature condition;

a heat dissipater that varies amounts of heat released from the exhaust gas in paths of the split passages from a branch point to the emission control catalysts; and a controller that changes proportions of amounts of flow of the exhaust gas into the split passages so that the predetermined temperature condition is satisfied in at least one of the split passages, wherein:

if the temperature of the exhaust gas that flows to the branch point does not satisfy the predetermined temperature condition of both of the emission control catalysts and the temperature of the exhaust gas that flows into one of the emission control catalysts can be controlled by a flow control of the controller so as to satisfy the predetermined temperature condition, the controller changes the proportions of the amounts of flow of the exhaust gas into the split passages so as to increase the amount of the flow of the exhaust gas into a split passage of less heat release.

7. An emission control method of an engine having an emission control catalyst that removes a component present in an exhaust gas that flows into the emission control catalyst at a high removal rate if a temperature of the exhaust gas satisfies a predetermined temperature condition, the method comprising:

providing a plurality of emission control catalysts, and distributing the exhaust gas discharged from the engine to the emission control catalysts, the exhaust gas being distributed simultaneously to the plurality of emission control catalysts; and changing proportions of amounts of flow of the exhaust gas into the emission control catalysts so that the temperature of the exhaust gas that flows into at least one of the emission control catalysts satisfies the predetermined temperature condition, wherein:

the exhaust gas discharged from the engine is distributed via a plurality of split passages that allow different amounts of heat to be released from each of the plurality of split passages, and the proportions of amounts of flow into the catalyst are changed by controlling the flow distribution through the split passages, and if the temperature of the exhaust gas after distribution does not satisfy the predetermined temperature condition of one of the emission control catalysts, and the temperatures of inflows of the exhaust gas to one of the emission control catalysts and to another emission control catalyst can be controlled so as to satisfy the predetermined temperature condition, the method further comprising the step of:

changing the proportions of the amounts of flow of the exhaust gas into the split passages so as to increase the amount of flow of the exhaust gas into a split passage of greater heat release.

8. An emission control method of an engine having an emission control catalyst that removes a component present in an exhaust gas that flows into the emission control catalyst at a high removal rate if a temperature of the exhaust gas satisfies a predetermined temperature condition, the method comprising:

providing a plurality of emission control catalysts, and distributing the exhaust gas discharged from the engine to the emission control catalysts, the exhaust gas being distributed simultaneously to the plurality of emission control catalysts; and changing proportions of amounts of flow of the exhaust gas into the emission control catalysts so that the temperature of the exhaust gas that flows into at least one of the emission control catalysts satisfies the predetermined temperature condition, wherein:

the exhaust gas discharged from the engine is distributed via a plurality of split passages that allow different amounts of heat to be released from each of the plurality of split passages, and the proportions of amounts of flow into the catalyst are changed by controlling the flow distribution through the split passages, and if the temperature of the exhaust gas after distribution does not satisfy the predetermined temperature condition of one of the emission control catalysts, and the temperatures of inflows of the exhaust gas to one of the emission control catalysts and to another emission control catalyst can be controlled so as to satisfy the predetermined temperature condition even by increasing the amount of exhaust gas that flows into a split passage of greater heat release, the method further comprising the step of:

increasing the amount of flow of the exhaust gas to an emission control catalyst that presently has a high removal rate, to such an extent that the temperature of the exhaust gas that flows into the emission control catalyst continues to satisfy the predetermined temperature condition.

9. An emission control method of an engine having an emission control catalyst that removes a component present in an exhaust gas that flows into the emission control catalyst at a high removal rate if a temperature of the exhaust gas satisfies a predetermined temperature condition, the method comprising:

providing a plurality of emission control catalysts, and distributing the exhaust gas discharged from the engine to the emission control catalysts, the exhaust gas being distributed simultaneously to the plurality of emission control catalysts; and changing proportions of amounts of flow of the exhaust gas into the emission control catalysts so that the temperature of the exhaust gas that flows into at least one of the emission control catalysts satisfies the predetermined temperature condition, wherein:

the exhaust gas discharged from the engine is distributed via a plurality of split passages that allow different amounts of heat to be released from each of the plurality of split passages, and the proportions of amounts of flow into the catalyst are changed by controlling the flow distribution through the split passages, and if the temperature of the exhaust gas after distribution does not satisfy the predetermined temperature condition of two emission control catalysts, and the temperature of the exhaust gas that flows into one of the two emission control catalysts can be controlled so as to satisfy the predetermined temperature condition, the method further comprising the step of:

changing the proportions of the amounts of flow of the exhaust gas into the split passages so as to increase the amount of flow of the exhaust gas into a split passage of less heat release.

* * * * *